US011869106B1

(12) United States Patent
Bykau et al.

(10) Patent No.: US 11,869,106 B1
(45) Date of Patent: Jan. 9, 2024

(54) CROSS-LISTED PROPERTY MATCHING USING IMAGE DESCRIPTOR FEATURES

(71) Applicant: Airbnb, Inc., San Francisco, CA (US)

(72) Inventors: Siarhei Bykau, San Francisco, CA (US); Peng Ye, Foster City, CA (US)

(73) Assignee: AIRBNB, INC., San Francisco, CA (US)

( * ) Notice: Subject to any disclaimer, the term of this patent is extended or adjusted under 35 U.S.C. 154(b) by 1023 days.

(21) Appl. No.: 16/578,116

(22) Filed: Sep. 20, 2019

(51) Int. Cl.
| | |
|---|---|
| *G06F 16/29* | (2019.01) |
| *G06F 16/583* | (2019.01) |
| *G06Q 10/02* | (2012.01) |
| *G06Q 50/16* | (2012.01) |
| *G06V 10/75* | (2022.01) |
| *G06Q 30/0201* | (2023.01) |
| *G06Q 30/0601* | (2023.01) |

(52) U.S. Cl.
CPC ........... *G06Q 50/167* (2013.01); *G06F 16/29* (2019.01); *G06F 16/583* (2019.01); *G06Q 10/02* (2013.01); *G06Q 30/0201* (2013.01); *G06Q 30/0623* (2013.01); *G06V 10/757* (2022.01)

(58) Field of Classification Search
None
See application file for complete search history.

(56) References Cited

U.S. PATENT DOCUMENTS

| | | | | |
|---|---|---|---|---|
| 11,436,240 | B1* | 9/2022 | Warnaar | G06F 16/5866 |
| 2008/0064333 | A1* | 3/2008 | Hymes | H04L 67/51 |
| | | | | 455/414.3 |
| 2010/0284620 | A1* | 11/2010 | Chertok | G06F 16/5854 |
| | | | | 382/209 |
| 2012/0163706 | A1* | 6/2012 | Zhang | G06V 20/35 |
| | | | | 382/203 |
| 2012/0314935 | A1* | 12/2012 | Cheng | G06V 20/20 |
| | | | | 382/154 |
| 2016/0027051 | A1* | 1/2016 | Gross | G06Q 30/0276 |
| | | | | 705/14.54 |
| 2016/0048934 | A1* | 2/2016 | Gross | G06V 10/764 |
| | | | | 705/313 |

(Continued)

OTHER PUBLICATIONS

Lazebnik et al., "Beyond Bags of Features: Spatial Pyramid Matching for Recognizing Nature Scene Categories," Proceedings of the 2006 IEEE Computer Society Conference on Computer Vision and Pattern Recognition (CVPR'06) (Year: 2006).*

(Continued)

*Primary Examiner* — Soo Shin
(74) *Attorney, Agent, or Firm* — Morgan, Lewis & Bockius LLP

(57) ABSTRACT

Two sets of data, each containing property listings, are obtained from two discrete merchant platforms. Each property listing in a set of data of a first merchant is sequentially paired with each of the property listings in a set of data of a second merchant. For each pair, each image of the property listing of the first merchant is compared to each image of the property listing of the second merchant, and images of statistically sufficient similarity are identified. The similarity of images, and in particular, of similar images likely to be rooms of the property, are considered in a determination of whether the product listings of the first and second merchant are for the same cross-listed product.

18 Claims, 10 Drawing Sheets

(56) References Cited

U.S. PATENT DOCUMENTS

| | | | |
|---|---|---|---|
| 2016/0092959 A1* | 3/2016 | Gross | G06Q 30/0625 |
| | | | 705/26.62 |
| 2016/0117347 A1* | 4/2016 | Nielsen | G06F 16/9024 |
| | | | 707/738 |
| 2017/0154204 A1* | 6/2017 | Ryu | G06V 10/462 |
| 2018/0018683 A1* | 1/2018 | Yee | G06Q 10/02 |
| 2018/0144458 A1* | 5/2018 | Xu | G06V 10/44 |
| 2021/0264685 A1* | 8/2021 | Velasquez | G06T 19/006 |

OTHER PUBLICATIONS

Vincent et al., "Matching Feature Points in Stereo Pairs: A Comparative Study of Some Matching Strategies," University of Ottawa (Year: 2001).*

* cited by examiner

1

24

0

571

CROSS-LISTED PROPERTY MATCHING USING IMAGE DESCRIPTOR FEATURES

BACKGROUND

A common business model for merchants operating in a digital environment is the facilitation of owner-to-consumer sales. An ecommerce merchant may, for instance, provide a platform for an owner of a particular product (or a property or service) to display its product to potential consumers for sale, rental, lease, or the like. Each product displayed, for example on the merchant's website or app, may correspond to a unique product listing containing information about the product, such as a description, images, and the like.

In some circumstances, the product offered for sale, rental, or lease may be a unique or scarce product, that is, a product that can only be purchased once, or once at a single time. Despite this scarcity, the owner of the product may use several platforms, in some cases provided by more than one merchant, to crosslist the same product and reach as many potential customers as possible. A merchant operator of one of such platforms may have an interest in identifying whether the product has been cross-listed across platforms.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

Figure 1:
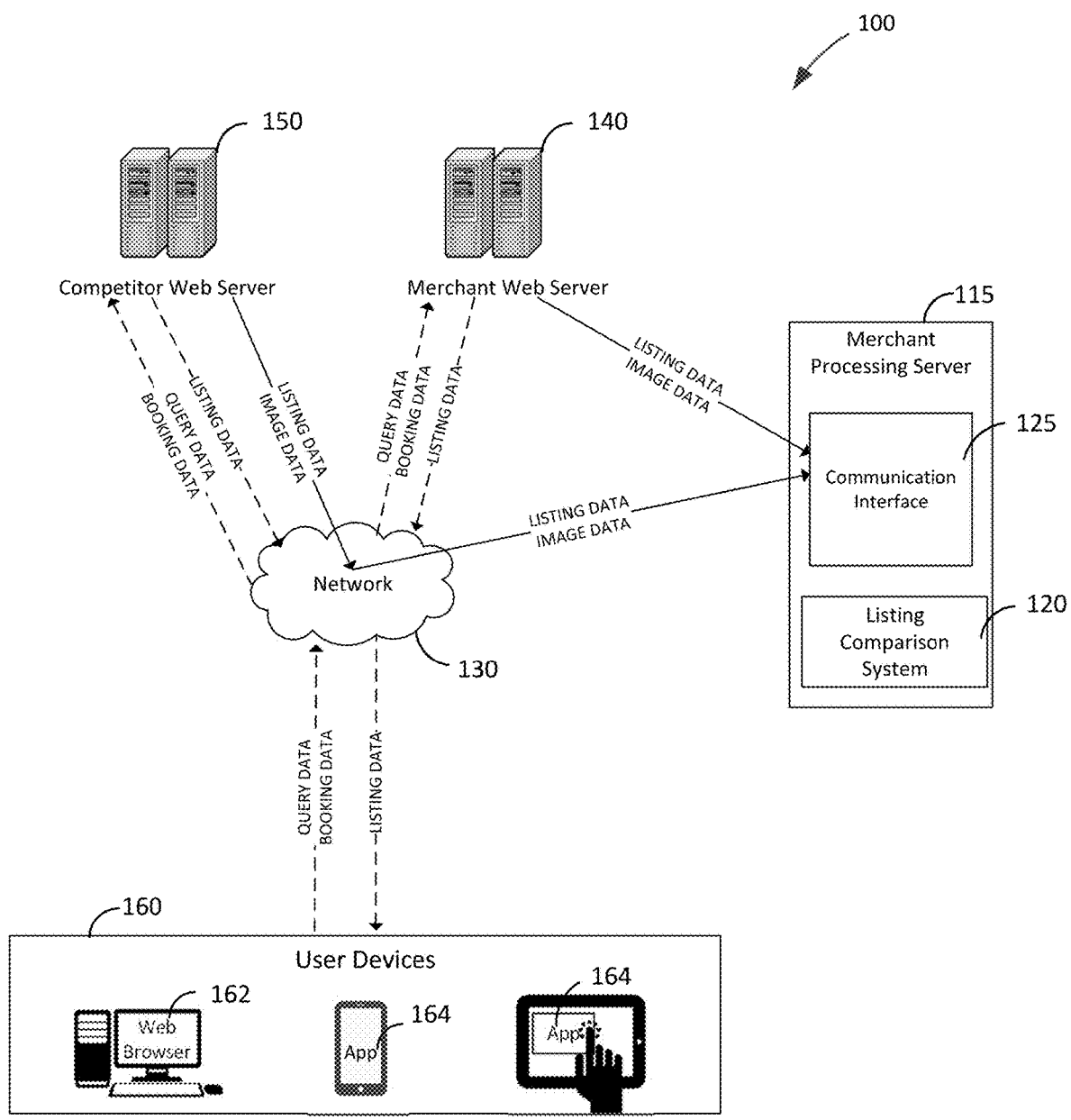
FIG. 1 is a diagram of an environment configured to generate a list of cross-listed property listings in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present invention generally pertains to systems and methods for recognizing whether a product is cross-listed over two computer platforms, each operated by a different respective merchant. The systems and methods described herein may, in an automated fashion, recognize that a product is cross-listed over two platforms even where listings for that product on the differing platforms may use differing images, and where the listings may use differing text, address, contacts, other descriptive information, or the like.

In an exemplary embodiment, identification of cross-listing is performed between two obtained sets of data corresponding respectively to one of two discrete platforms, each platform managed or owned by a different entity (referred to herein as merchant and competitor, a competitor being a competing merchant that may offer to consumers similar products as the merchant). The sets of data contain respective sets of product listings, each with one or more images associated with the respective product and/or other information descriptive of that product. Each product listing in a set of data of a first merchant is sequentially paired with each of the product listings in a set of data of a competitor merchant. For each pair of listings, each image of the product listing of the first merchant (a source listing) is compared to each image of the product listing of the competitor (a target listing), and images of statistically sufficient similarity are identified. The similarity of images, and in particular, of images of a certain type or category relevant to the type of product, is considered to determine whether the product listings of the first merchant and the competitor are for the same product, i.e., that the product is cross-listed between the first and second merchant platforms, as opposed to being for two different unique products.

In one embodiment, a merchant may provide an online reservation system that displays to potential customers properties, such as houses, condominiums, rooms, apartments, lots, and other real estate, offered to the potential customer (or guest) by an owner/manager of the property for reservation (sometimes referred to as a "booking" or "rental") for a specified time period (e.g., a day, week, month, or another period of interest). The owner of a property may contract with the merchant to use the merchant's reservation system to display a property "listing" for the reservable property, which listing may contain information about the property such as images, descriptions, price ranges, dates, number of bedrooms, location, amenities, and/or other factors that may be of interest to guests in making a reservation. When a customer books a property, the merchant's online reservation system may allow for intake, from the customer, of a booking fee, an initial setup fee, a recurring fee, no fee, and/or any other appropriate value. In some instances, the merchant may also handle and/or facilitate one or more financial transactions relating to the purchase or booking of that property, and may receive a fee in relation thereto. In some such embodiments, any single property may be booked only once (or a limited number of times) for a certain time period. Accordingly, if a property is cross-listed on a platform other than the merchant's platform (the other platform also being referred to herein as a competitor platform or competitor's platform) and is booked for a certain time via that other platform, the property becomes unavailable for booking for the same time via the merchant's platform. Accordingly, a merchant with a platform offering a unique product for purchase or rental may be interested in knowing whether and how a property owner using the merchant's platform has also displayed or offered that property on other platforms managed by other merchants.

Such business models are of course not limited to property listings, nor are they limited to scarce or unique products. Rather, the systems and methods described herein may be provided for any set of products or services that are potentially available to be listed across multiple platforms.

In an exemplary embodiment, a geographic area is divided into virtual tiled regions, each tile having a designated or pre-determined size. In one embodiment, the entire global surface may be tiled, with each tile corresponding to two-dimensional square of a particular size. In other embodiments, only a subset of geographic space may be tiled, such as areas corresponding to physical property listings stored in a first merchant database, areas corresponding to a certain geographical or political area (such as a city, country, etc.), or any other appropriate delimiter.

In some embodiments, it is assumed that cross-listed listings are geographically close. That is, while the cross-listed property itself would have only one location, the listings for that property may variously contain inaccurate, incomplete, or not fully descriptive location information (e.g., a multi-unit building address, neighborhood or zip code) and each listing may therefore only be identifiable to within a certain shared or proximate geographic region (here, a tile). To account for this, the images for each listing within a first merchant database are compared to those of listings, in a competitor merchant database, within the relevant geographic tile (in-tile pairs) and the adjacent geographic tiles (cross-tile pairs), to identify if the listings refer to the same property. A collection of all images stored in association with all listings within a relevant geographic tile and its neighboring geographic tiles is pulled from two computer platforms (though any number of platforms may be used in other embodiments). The images may then be stored in platform-specific databases. For example, where two source platforms are used, the image data is sorted, by platform, into two databases. Each database is then analyzed to determine whether duplicate images exist therein, and if so, those duplicate images are removed, flagged, or filtered. In one embodiment, the A-KAZE algorithm may be used to recognize and/or flag duplicate images.

Listings from different platforms identified as being geographically proximate are paired (or in some embodiments, each of the stored listings from different platforms are paired regardless of location). The images of each paired listing are then analyzed to determine whether the similar images indicate a cross-listing, where the relevance of similar images is weighted differently based on an assigned image category. More particularly, to determine whether two images are the same (or sufficiently similar), the A-KAZE algorithm may be used to extract image keypoints for each image, and descriptors for each keypoint (a highly-dimensional vector) are extracted. For each 1:1 pairing of images between the two platform-specific databases, keypoint metadata (descriptors) is compared. Where a statistically significant number of descriptors match between two images, the images are determined to be of the same subject, e.g., images of the same room, of the same building, of the same view, etc., whether or not the images are completely identical. For instance, images taken at slightly different angles of the same may be determined to be sufficiently similar so as be of the same subject.

Further, because many property listings use similar or identical images that are not necessarily indicative of an identical property (e.g., images of area sights or activities, such as the Eiffel Tower for listings located in Paris, a shared pool/lobby, building or area amenities, an area map, etc.), images are categorized to determine their relevance to an identification of actual sameness. In some embodiments, this analysis may be performed partially or in whole by a machine learning algorithm trained against historical sets of images and/or image classifications. For instance, in some embodiments, a machine learning model is applied to classify images into one of: kitchen, bathroom, living room, bedroom, pool, or view. In an exemplary embodiment, pictures associated with a certain category, such as room pictures of a property, are considered more important or indicative of a cross-listed listing than a view image that may be shared by different are properties. In different embodiments, different image categories may be considered more indicative of property sameness, based on the type or classification of images that is assumed or understood to be most authentic.

In an exemplary embodiment, for each pair of listings including a source merchant listing and a target competitor listing, the following key features may be used to determine whether images of the paired listings are sufficiently similar so as to indicate a cross-listed listing: 1) The number of keypoints shared between the most similar images of the two listings, 2) The number of keypoints shared between the most similar images of the two listings that are highly likely to be of a room (e.g., probability that image is room×number of keypoints), and 3) The number of image pairs between the listings that are rooms. In some embodiments, this determination may be performed by one or more machine learning algorithms.

Conventional solutions may be unable to determine whether the same product is cross-listed over different platforms. This is because the same product can be listed over different platforms with different images, text, descriptions, address, contact information, and/or other information, making it a non-trivial task to identify that the given pair of listing are the same home. Further, the data in the listings is provided by hosts and thus those images, text, descriptions, etc. might be inaccurate and/or noisy. In conventional implementations, manual review by a merchant may be needed to make a confident determination as to sameness of the offered product. It is therefore generally desired to have an automated, dynamic process that provides highly accurate and scalable identification of cross-listings using only the information of the listings provided by the product owners. In the case that the product is a home or rental property, that owner-provided information may include information such as listing images, textual descriptions, general or specific geographic location (such as a city, latitude/longitude identifier, address, intersection, building identifier, or the like) and/or room capacities.

By the systems and methods described herein, highly-accurate identification of cross-listed product or property listings can be obtained, even where specific addresses are not provided for the properties and/or where the provided descriptive portions of the cross-listings differ or are inaccurate. A merchant may find such knowledge useful, for example to understand its own product inventory, optimize its fees, obtain industry knowledge, and the like. Additionally, the systems and methods disclosed herein may allow the merchant to obtain competitive insights of the marketplace, accurately measure the supply on each platform as well as take actions to increase the market share by targeting cross listed inventory. The systems and methods herein can automatically obtain insights about the marketed position of different products or services, without the input or confirmation of the owners of those products or services who may be numerous discrete entities. Effective marketing decisions can be made based thereon.

FIG. 1 depicts an exemplary environment 100 for collecting information from a plurality of platforms and comparing product or service listings across those platforms to determine if a listing has been cross-listed, that is, that the same product or service is listed across multiple platforms. In the embodiment of FIG. 1, listing comparison system 120 (a component part of merchant processing server 115) is managed or facilitated (and in some embodiments, owned) by a service provider. The service provider may be generally understood as an individual, entity, or organization that displays or delivers to an end user (also referred to herein as a customer or potential customer) information or user interfaces to allow the user to purchase or book one or more products, services, and the like. In an exemplary embodiment, the service provider may be a merchant or entity that uses or runs an ecommerce website, app, or other type of user interface through which customers may buy, sell, rent, lease, and/or otherwise purchase or subscribe to the provider's products or services.

In one exemplary embodiment, the merchant may provide an online reservation system that displays listings of properties, such as houses, condominiums, rooms, apartments, lots, and other real estate that has been offered for reservation and that may be reserved for a specified time period (e.g., a day, week, month, or other period of interest). In such embodiments, a product can be understood as a reservation for a particular physical property during a particular range of time (e.g., a day). In some embodiments, the physical property may have a real geographic location that can be variously identified by any of: a street and/or postal address, a zip code, an street intersection, the name or address of a building, neighborhood, campus, or complex, a longitude and/or latitude value, a set of triangulated distances from one or more known geographic locations, information sufficient to describe the location with respect to one or more other properties, or any other appropriate identifier that narrows or uniquely reflects the location of the property. Other embodiments are not limited to property rental, or to any other particular purpose or industry, and the systems and methods described herein may be provided for any type of products or services that are potentially available to be listed across multiple platforms.

For ease of explanation, the present disclosure may discuss property listings as exemplary versions of products, though other implementations may use listings for any other appropriate type of product or service. In an exemplary embodiment, the merchant service provider may display to the user information regarding a listing in response to a query for, e.g., a geographic location and/or a property characteristic. In some embodiments, a listing for one or more properties may be displayed to the user in response to user activity, such as, e.g., the user's viewing of a webpage or a property listing associated with a geographic region or area, the user's interactions with the merchant's website or e-commerce interface, such as searching or filtering against an index of properties (or data associated therewith), locations, and/or dates/date ranges, among many other things.

As shown in FIG. 1, a listing comparison system 120 may be implemented by a merchant processing server 115 or other type of device or system that is connected to a network 130 via at least one communication interface 125. Additionally connected to network 130 is at least one merchant web server 140 (which in some embodiments may be part of a system that also houses or is integral with the merchant processing server 115) and at least one competitor web server 150. In some embodiments, the merchant processing server 115 and the merchant web server 140 are owned and/or operated by the same entity. In an exemplary embodiment, the merchant web server 140 is connected to the same internal network as the merchant processing server 115, such that information on the merchant web server 140 may be understood as information "internal" to listing comparison system 120. In other embodiments, the merchant web server 140 may be any computer system from which merchant processing server 115 may pull information, including, e.g., listing data and/or image data. In some embodiments, merchant processing server 115 may collect such information from merchant web server 140 via network 130.

Network 130 may comprise one or more network types, such as a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. In some embodiments, the network 130 may be the Internet and information may be communicated between system components in an encrypted format such by a transport layer security (TLS) or secure socket layer (SSL) protocol. In addition, when the network 130 is the Internet, the components of the environment 100 may use the transmission control protocol/Internet protocol (TCP/IP) for communication. In embodiments where merchant processing server 115 and merchant web server 140 are owned or managed by the same merchant entity, servers 115 and 140 may additionally or alternatively be connected through one or more networks internal to the merchant entity's system (not specifically shown) rather than via network 130, where network 130 may be, in such embodiments, the Internet or any other publicly accessible network.

Competitor web server(s) 150 may be any remote computer system that is communicably accessible by merchant processing server 115 via network 130. In an exemplary embodiment, competitor web server 150 is owned and/or managed by a service provider entity different from the one that owns or manages merchant web server 140. In the exemplary embodiment, the competitor web server 150 is external to a network to which the merchant processing server 115 and the merchant web server 140 are connected, such that information from competitor web server 150 may be understood as information "external" to system 120. Competitor web server 150 may make available one or more product or property listings (which may include listing data and/or image data) through a website, app, or other user interface (referred to herein individually or collectively as the competitor's "webpages" for ease of reference).

As shown in FIG. 1, merchant web server 140 and competitor web server 150 are communicably accessible to users who may wish to use the system to view and/or reserve (book) property listings. For instance, each of merchant web server 140 and competitor web server 150 may receive query data and/or user data from and transmit query results (including listing data and image data) to one or more user devices, referred to herein individually or collectively as user device(s) 160. A user device 160 may be used by individuals or entities to access, view, and/or take action in response to content delivered to the user from the respective web server 140, 150. A user device 160 may be implemented by one or more computing devices, such as a smartphone or other handheld device (e.g., a tablet or reader), desktop computer, laptop computer, touchscreen device, or any other appropriate device capable of receiving, processing, and outputting digital information via network 130. In an exemplary embodiment, the user device 160 presents information to a user via a display on or connected to the device 160, and takes input from the user in relation thereto (for example, through interactive graphics or hyperlinks) via a touchscreen, mouse, keyboard, stylus, or any other appropriate input device. Each user device 160 may have installed a web browser 162 and/or other appropriate applications 164 that can be used to communicate (receive and transmit data) with the merchant web server 140 or the competitor web server 150 via the network 130. In some embodiments, app 164 may be a mobile application or other software application distinct from a generic web browser, such as an e-mail, messaging, or social media application, an application specific or related to the merchant, competitor, or an e-commerce business, or another program capable of receiving digital content from the web servers 140, 150 and delivering such content to the user of the device. While FIG. 1 illustrates a one-to-one correspondence between a user device 160 and one of a web browser 162 or app 164, the embodiments are not so limited. For instance, a user device 160 may in one embodiment be a smartphone on which several apps 164 are installed (e.g., web browser, e-commerce app, social media app, etc.), each of which may serve as a channel over which the user may interact with the merchant or competitor. The digital content transmitted to the user devices 160 from merchant web server 140 and/or competitor web server 150 may include listing data, for example data identifying a product (e.g., a property listing) as well as data relating to such property, such as any of: image data or one or more images, text-based and/or otherwise unstructured description data, one or more fields providing structured information about the property, information representing the property's availability (e.g., a calendar, list, or set of dates on which the property is or can be booked), information sufficient to contact the owner of the property, location information sufficient to identify (to any of varying degrees of granularity) a particular geographic location of the property, such as a map, street, or postal address, latitude/longitude, neighborhood or locality, intersection, etc., and/or other information relevant to the property, such as restrictions/features of the property, traffic, proximate activities or amenities, or information about the location, such as traffic and weather information, among other things.

In some embodiments, the user device 160 may display a user interface (e.g., a graphic user interface, through app 164 or web browser 162) through which the customer can view, search against, buy, sell, rent, lease, and/or otherwise purchase or subscribe to the merchant's products or services. That is, the user interface may provide one or more components of a point-of-service (POS) system between user and the merchant or the competitor. Further, while FIG. 1 illustrates only three user devices 160, one merchant web server 140, and one competitor web server 150, it may be understood that any number of users, any number of servers, and/or any number of competitors may be variously configured in different embodiments.

Figure 2:
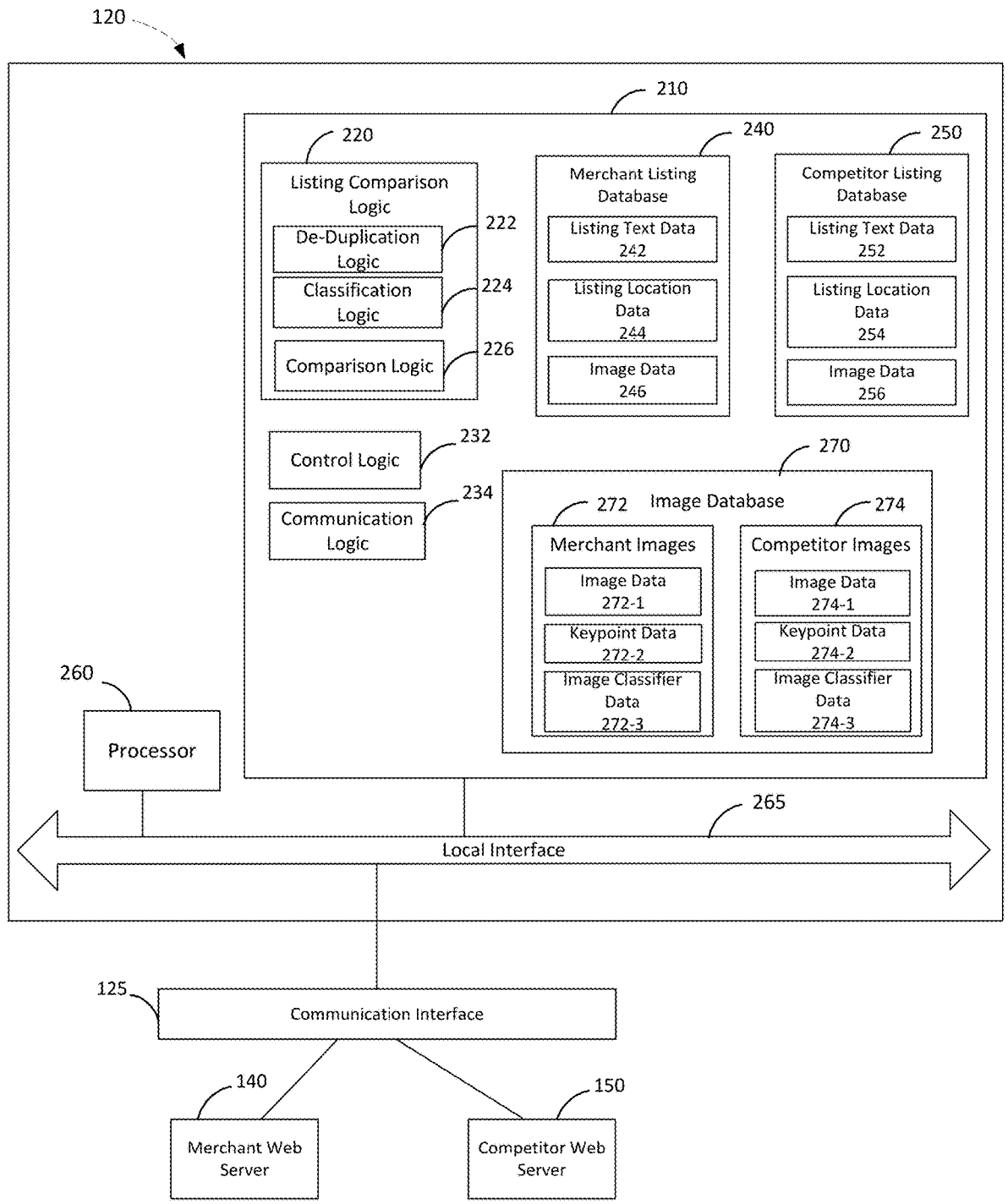
FIG. 2 illustrates select components of a listing comparison system in accordance with some embodiments of the present disclosure.

FIG. 2 depicts an example schematic diagram of certain components of listing comparison system 120 in accordance with some embodiments of the present disclosure. The listing comparison system 120 may include a memory 210. As used herein, memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 210 may store instructions used in the systems and methods described herein. While FIG. 2 illustrates a single discrete memory 210, it will be understood that the embodiments described herein are not limited to any particular arrangement and that other embodiments may store information in one combined memory, or with information stored in a different configuration in one or more memories, some local to the other components illustrated in FIG. 2 and/or some shared with, or geographically located near, other remote computing systems.

The illustrated embodiment depicts a number of modules stored in memory 210, specifically, listing comparison logic 220 (including de-duplication logic 222, classification logic 224, and comparison logic 226), control logic 232, and communication logic 234. These depicted modules may variously represent one or more algorithms, computational models, decision making rules or instructions, or the like implemented as software code or computer-executable instructions (i.e., routines, programs, objects, components, data structures, etc.) that, when executed by one or more processors 260, program the processor(s) to perform the particular functions of their respective logic. These modules are depicted in FIG. 2 as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof. The capabilities of these various logics are described in greater detail below.

The listing comparison system 120 may include control logic 232, including one or more algorithms or models for generally controlling the operation of the listing comparison system 120. The memory 210 may also, in one embodiment, include communication logic 234, including one or more algorithms or models for obtaining information from or communicating information via network 130 (FIG. 1). The listing comparison system 120 may, via communication interface 125, operate to exchange data with various components and/or devices on the network 130 or any other network. For instance, communication interface 125 and communication logic 234 may be used (by, e.g., listing comparison logic 220 in the manner(s) described in greater detail below), to access data from one or both of merchant web server 140 and competitor web server 150. In some embodiments, communication logic 234 may use APIs provided by merchant web server 140 or competitor web server 150 to obtain their respectively stored data, however, other methods of data collection may alternatively be used such as one or more software development kits, which may include, e.g., one or more application programming interfaces (APIs), web APIs, tools to communicate with embedded systems, or any other appropriate implementation.

In one embodiment, communication logic 234 (via communication interface 125) may crawl or spider the webpages provided by competitor web server 150 to develop indices or datasets of the content of those webpages, such as data regarding the particular product listings made available by the competitor. In another embodiment, communication logic 234 may obtain data about the content of those webpages from a remote server, such as a merchant-managed or third-party service, which has in turn collected data from and about the competitor's webpages. In still other embodiments, communication logic 234 may obtain listing data and/or image data from one or more databases (or other data structures) on competitor web server 150 or another system connected thereto. These actions are not limited to performance by the communication logic 234 and/or communication interface 125, but in other embodiments may be performed by any element or component of system 120 or merchant processing server 115.

While communication logic 234 is illustrated as being a separate logical component, in an alternative embodiment, the listing comparison system 120 may include communication logic 234 as part of listing comparison logic 220 or control logic 232. In another alternative embodiment, the communication logic 234 may communicate with third-party systems and/or may coordinate with the control logic 232 to read or write data to memory 210 or to another data repository (not shown) within the listing comparison system 120.

In some embodiments, listing comparison system 120 may be implemented in whole or in part as a machine learning system (e.g., neural network software) for achieving the functionalities described herein. In one embodiment, one or more of de-duplication logic 222, classification logic 224, and comparison logic 226 (or any subset of any of those logics) may be implemented at least in part as one or more machine learning algorithms, as described in more detail below.

While, in the exemplary embodiment, each of listing comparison logic 220, de-duplication logic 222, classification logic 224, comparison logic 226, control logic 232, and communication logic 234 is depicted as part of listing comparison system 120, these logical components need not be so configured, and in other embodiments, other configurations of the various components, within listing comparison system 120 or distributed over one or more computing systems, are possible. Listing comparison logic 220, de-duplication logic 222, classification logic 224, comparison logic 226, control logic 232, and/or communication logic 234 may be variously implemented in software, hardware, firmware or any combination thereof. In the exemplary listing comparison system 120 shown in FIG. 2, listing comparison logic 220, de-duplication logic 222, classification logic 224, comparison logic 226, control logic 232, and communication logic 234 are implemented in software and are stored in memory 210 of the listing comparison system 120. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus.

The logics of the exemplary listing comparison system 120 depicted in FIG. 2 may be executed by one or more conventional processing elements 260, such as a central processing unit (CPU), digital signal processor, other specialized processor or combination of processors, or other circuitry that communicates to and drives the other elements within the listing comparison system 120 via a local interface 265, which can include at least one bus. As an example, the processor 260 may execute instructions of software stored in memory 210, such as listing comparison logic 220, de-duplication logic 222, classification logic 224, comparison logic 226, control logic 232, and communication logic 234. While FIG. 2 illustrates one processor 260 which implements all of the various logics in the listing comparison system 120, it is possible in other embodiments for the system 120 to employ multiple processors. In one such alternate embodiment, discrete processing elements may be used for each of (or any subset of) listing comparison logic 220, de-duplication logic 222, classification logic 224, comparison logic 226, control logic 232, and communication logic 234, or any portions or subsets of those logics. In some embodiments, the processing of system 120 is not limited to being performed by a processing element connected to the local interface 265, but instead, any portion of processing in support of the various logics of listing comparison logic 220 may be distributed over one or more computer systems that may be remotely located. In some embodiments, the processor 260 may comprise an artificial neural network or other type of configuration for performing machine learning functions based on instructions stored in memory 210.

Memory 210 may be configured, in some embodiments, to include a merchant listing database 240 that stores information related to one or more property listings managed by the merchant's systems, obtained from merchant web server 140. Memory 210 may also include a competitor listing database 250 that stores information related to one or more property listings managed by a competitor merchant's systems, obtained from competitor web server 150 or in some embodiments from crawling the competitor webpages (or the like) in the manner described above. The various described logics stored in memory 210 may read data from or write data to the merchant listing database 240 and competitor listing database 250 as part of their respective calculations and/or processing.

In an exemplary embodiment, both merchant listing database 240 and competitor listing database 250 may be generally understood to contain similar types of information about one or more property listings stored on the respective entity's web server. The data stored in database 240 may include comprehensive property listing information obtained from merchant web server 140, and the data stored in database 250 may include comprehensive property listing information obtained from competitor web server 150. In some embodiments, the data stored in either or both of the two respective databases need not be comprehensive of all property listings on either web server, but instead may include only a subset thereof, limited by, e.g., geographic boundaries, ownership information, price, availability, limitations on authorization to obtain information, or any other relevant factors, including information known internally to or assigned internally by the system 120 or the servers 140, 150.

In one embodiment, each property listing in merchant listing database 240 corresponds to a discrete physical property, and each property listing in competitor listing database 250 corresponds to a discrete physical property, where the listings in databases 240, 250 may have some overlap in their referenced properties. In some embodiments, information about each particular listing is stored in association with a unique identifier. In some embodiments, information about a listing may be stored in association with one or more other listings in database 240, for example in the case of related listings, listings owned by the same owner, multiple listings that belong to a single, integral property (e.g., a larger building), and the like. In some embodiments, the data stored in merchant listing database 240 includes, for each property listing stored in the database, information that may be presented, in some form, to the user via a user interface of web browser 162 or app 146 so as to inform the user about the property. Such information may include listing text data 242 that provides text-based and/or human-readable description of the listing. The information in merchant listing database 240 may also include, for each property listing stored in the database, listing location data 244 identifying (to any discernable degree of granularity) a particular geographic location of the property, such as any of: a street and/or postal address, a zip code, an street intersection, the name or address of a building, neighborhood, campus, or complex, a longitude and/or latitude value, a set of triangulated distances from one or more known geographic locations, information sufficient to describe the location with respect to one or more other properties, or any other appropriate identifier that narrows or uniquely reflects the physical location of the property. The information in merchant listing database 240 may also include, for each property listing stored in the database, image data 246 including one or more images uploaded in connection with the property, typically selected by a property owner or in some embodiments automatically obtained or selected.

Competitor listing database 250 may be used to store similar types of data as that stored in merchant listing database 240. For instance, competitor listing database may store listing text data 252 (generally similar to listing text data 242), listing location data 254 (generally similar to listing location data 244), and image data 256 (generally similar to image data 246). In some embodiments, the types and/or formats of the data stored in competitor listing database 250 need not necessarily align with that of merchant listing database 240. In some embodiments, listing memory 210 may contain one or more logics (not shown) configured to standardize the data formatting between the data stored in merchant listing database 240 and the data stored in competitor listing database 250.

The number of property listings in the merchant listing database 140 need not align on a 1:1 basis with those in the competitor listing database 150, nor do the content of the property listings necessarily need to overlap in whole or in part. In an exemplary embodiment, even where a listing in merchant database 240 is for the same unique property as a listing in competitor listing database 250, the information contained in the two listings need not necessarily be identical or overlapping (though they may be in some embodiments). For instance, the number and types of images contained in one listing may differ from that of the other listing. Further the listing description, location (if any), or any other listing data may differ between the two listings.

In other embodiments, either of merchant listing database 240 or competitor listing database 250 may additionally variously store any of: one or more fields providing structured information about the property, information representing the property's availability (e.g., a calendar or list of dates/hours on which the property is or can be booked), information sufficient to contact the owner of the property (e.g., phone number, email, or website), and/or other information relevant to the property, such as restrictions/features of the property, traffic, proximate activities or amenities, or information about the location, among other things. In embodiments where the merchant provides a platform for property rental, merchant listing database 240 may also include information about a listing's current bookings (or purchases), prospective bookings, and/or information about past bookings, and/or any other appropriate type of information specific to or related to the listing.

It will be generally understood that while one competitor web server 150 (external to the system 120) is shown, any number of data sources, whether local or remote to the listing comparison system 120 may be used, in various configurations, in different embodiments. Correspondingly, in some embodiments, memory 210 may contain one or more additional databases (not shown), each corresponding to a different data source from which a set of platform-specific listings may be collected. To illustrate, if five (or any number) different entities, including the merchant and competitor described above, offer discrete platforms for relevant property listings for rental or sale, then listing comparison logic 220 may work by itself or in collaboration with control logic 232 to create a corresponding five (or any number) of databases, each corresponding to a different entity and/or platform. The systems and methods described herein may then be applied to data from any two of such multiple databases to determine whether any cross-listed listings exist therebetween.

In the embodiment of FIG. 2, memory 210 may be configured to include, in an image database 270, a merchant images repository 272 and a competitor images repository 274. Merchant images 272 and competitor images 274 may include image data (272-1 and 274-1, respectively), similar to or a subset of the data stored in image data 246 and 256, keypoint data (272-2 and 274-2, respectively), which data describes points of interest in the images of image data 272-1, 274-1, and image classifier data (272-3 and 274-3, respectively), classifying images in descriptive categories as described in greater detail below. In some embodiments, image database 270 may also store comparative keypoint data between image pairs from merchant images 272 and competitor images 274, as described in greater detail below. In some embodiments, the data in in merchant images 272 and competitor images 274 may be pulled from merchant listing database 240 and competitor listing database 250, respectively. In other embodiments, merchant image data stored in merchant images 272 and competitor images 274 may be obtained directly from merchant web server 140 and/or competitor web server 150 respectively, rather than pulled from the listing databases. In still other embodiments, image database 270 may not be used and rather, listing comparison logic 220 may instead compare and/or process image data as it is stored in databases 240 and 250. In such embodiments, image data 246 and 256 may be understood to additionally store keypoint data and image classifier data, as described below.

In the embodiment of FIG. 2, either or both of merchant images 272 and competitor images 274 may include, in association which each image stored therein, image classifier data 272-3 or 274-3, respectively. An image classifier may group or categories an image associated with a listing as falling into one of several predetermined categories. In an exemplary embodiment involving property rental, the image classifiers may delineate an image as being in one of six categories: Kitchen, bathroom, bedroom, living room, pool, or view (including any other images, such as those depicting subjects outside of the rental property, maps, area sights, and the like). Other embodiments may use any number or type of image classifiers. Further, in different embodiments that are unrelated to property rental, different categories may be used. In general it may be understood that image classification categories are determined based on the type of images that a product or service owner (such as the host of a physical property rental) would commonly upload in association with a listing. In a preferred embodiment, the classification of images into one of the predetermined categories is done by classification logic 224, which may use in some embodiments, an automated program including a learning or other AI solution. That is, classification logic 224 may use one or more machine learning algorithms to determine, for each image in merchant data 272 and/or competitor images 274, a classification. The determined classifications may be stored, in association with information sufficient to identify the image, as image classifier data 272-3, 274-3. However, other embodiments may use any type of manual or automated category identification applied by merchant web server 140 or within the system 120.

In an exemplary embodiment, one or more data structures may be stored in the memory 210 to facilitate search against the databases 240, 250, and 270 and/or any other databases. Such data structures may include, for example, a search inverted index that creates, for each listing stored in databases 240 and 250 a mapping from the properties and/or attributes associated with a listing and/or its images to a unique ID associated with the listing. Memory 210 may additionally or alternately include a data structure that facilitates the converse search, that is, an index that creates, for each listing stored in databases 240 and 250, a mapping from the unique ID associated with an listing to the properties and/or attributes associated with the listing and/or its images.

It will be noted that while the term "database" or "repository" is used with reference to systems 210, 240, 250, and 270 and/or the data structure therein, these components are not so limited nor is any particular form or configuration of data storage mandated, and the described "databases" may alternatively be an indexed table, a keyed mapping, or any other appropriate data structure. In an exemplary embodiment, database 210, merchant listing database 240, competitor listing database 250, image database 270, and system 120 as a whole are managed by the service provider so as to be connected to a local network, however, other configurations may be possible in other embodiments, as long as system 120 is able to access data from the databases 240, 250, and/or 270.

FIG. 3 illustrates an exemplary process by which system 120 can identify whether a listing stored in an internal database is cross-listed between two platforms, identified here as an internal platform and an external platform, though other embodiments are possible where information is compared between two competitor (i.e., external) platforms. In an exemplary embodiment, system 120 pulls two sets of data, each containing property listings, from an internal platform (merchant web server 140) and an external platform (competitor web server 150). Images from the listings are stored in the image database 270 as either merchant images 272 or competitor images 274, in association with the respective listing from which they came. The exemplary process begins at Step 302, in which image data is accessed from each listing of the internal platform (e.g., merchant listing database 240). The image data is then stored (Step 304) in a repository dedicated to internal images, for instance, merchant images 272 in image database 270. In the exemplary embodiment, because the internal platform is readily accessible to the components of system 120, the accessing of image data may be done at any time and in any quantity, e.g., as a periodic or scheduled transfer of image data, as a real-time pull from merchant listing database 240, written/copied to image database 270 as listings are created, modified, or deleted on the merchant platform, or any other appropriate method.

In step 306, image data is accessed from each listing of the external platform, e.g., competitor listing database 150. The image data is then stored (Step 308) in a repository dedicated to external images, for instance, competitor images 274 in image database 270. In one embodiment, information may be pulled from the external platform via communication interface 125 and network 130, on a periodic or scheduled basis. For instance, in one embodiment, system 120 may receive monthly dumps of listing data from competitor web server 150, however, in other embodiments, any schedule of information transfer (e.g., daily, weekly, monthly, real-time, etc.) may be used.

In an exemplary embodiment, the transfer of information in steps 302 and 306 is comprehensive of the listings on the merchant and competitor platform, respectively. During an initial pull/transfer of data, the set of image data will be new (or with limited redundancy), however, subsequent transfers may be significantly duplicative or redundant of data already stored in appropriate tables of image database 270. In other embodiments, a subset of listing data is accessed and stored from the internal and external platforms, however, the same issue of duplicative data may still exist. Some embodiments may therefore simplify comparison and mitigate inefficiencies by applying de-duplication logic 222 to remove duplicative images within the stored merchant images 272 and/or within the stored competitor images 274. This de-duplication is done in Step 310. In an exemplary embodiment, any known algorithm for de-duplication may be used (whether doing a point-by-point comparison, fingerprinting or hashing algorithms, comparison of file information, or any other appropriate method) to identify identical images. Some embodiments may also remove near-duplicate images. As a result of the de-duplication in step 310, each image in merchant images 272 will be unique to the other merchant images, and each image in competitor images 273 will be unique to the other competitor images, though images may still exist in common between merchant images 272 and competitor images 274.

Once de-duplicated, a two-stage computation is performed to compare pairs of images. Initially, an image-level processing is performed. Thereafter, a listing-level comparison is performed.

Turning first to the image-level processing, an exemplary process proceeds to Step 312, where, for each of the images in the de-duplicated image data, one or more image keypoints are extracted. A keypoint may be generally understood as a spatial location in the image that defines a point of interest in the image. A keypoint may be accompanied by one or more descriptors defining relevant information such as the size and/or orientation of the point of interest (e.g., a corner or a change of color, or any other relevant feature). A keypoint's descriptors allow for unique identification of a keypoint using a highly-dimensional vector (e.g., a binary vector or a float vector). Where a large number of keypoints are shared between two images, the images have a statistically significant chance of being similar or near-similar. Keypoint extraction may be performed by any known method or mathematical transformation, though in an exemplary embodiment, the A-KAZE algorithm (Accelerated KAZE) may be used. In another embodiment, the Scale-Invariant Feature Transform (SIFT) algorithm may be used.

This process of keypoint extraction is performed for each of the merchant images 272 and the competitor images 274. Extracted keypoints may be stored, in the exemplary embodiment, in the image database 270 in association with the image data being considered. Keypoint descriptors in a first image can then be compared (matched or distinguished)

with those of a second image in a process of keypoint matching. In the exemplary embodiment, keypoint matching allows the comparison to recognize two images to be of the same subject, invariant to differences in scale, rotation/orientation, brightness, resolution, or angle of two images.

Step 314 involves a classification of images into one or more image categories. In an exemplary embodiment, this classification is performed for only the images in merchant images 272, which images are used as images corresponding to "source" listings for purposes of comparison. In other embodiments, images in both merchant images 272 and competitor images 274 may be classified into categories, a more comprehensive and therefore more resource-intensive process. A known method of assigning a label to an image may be applied. In an exemplary embodiment, an artificial intelligence solution is applied to classify an image of a property listing into one of six categories: kitchen, bathroom, bedroom, living room, pool, or view, where view captures any other type of image (e.g., outside image, maps, etc.). Of course, these categories are simply exemplary and other embodiments may use any number of categories with any different category descriptors. For instance, in different embodiments that are unrelated to property rental, different categories may be used. In an embodiment where a product listing reflects a physical product, categories may include, for instance, images of the packaging of the product, of the product in use, of instructions, and the like. In the case of art, such categories might include images of the art, of authenticating documentation, and the like. In general, it may be understood that image classification categories are determined based on the type of images that a product or service owner (such as the host of a physical property rental) would commonly upload. Other embodiments may not use an artificial intelligence solution and instead, may involve the manual classification of images, or any other appropriate method.

Next, a listing-based comparison may be performed for each combination of a source listing with a candidate target listing. In an exemplary embodiment, comparison logic 226 sequentially pairs each property listing in the data from the internal (e.g., merchant) platform (e.g., $M_1$, $M_2$, $M_3$ . . . ) with each of the property listings in the data from the external (e.g., competitor) platform (e.g., $C_1$, $C_2$, $C_3$ . . . ). Put another way, a series of pairings or tuples is created, where each internal listing is paired with a respective each external listing (($M_1$, $C_1$), ($M_1$, $C_2$), ($M_1$, $C_3$), . . . ($M_2$, $C_1$), ($M_2$, $C_2$), ($M_2$, $C_3$) . . . ). For each pair, each image of the property listing of the competitor is compared to each image of the property listing of the merchant. For ease of reference in discussing the comparison, the first listing of each of these tuples or pairings may also be referred to herein as the "source" listing, and the second listing may also be referred to herein as the "target".

Comparison logic 226 determines whether the source listing and the target listing share (that is, have in common) the similar or the same images. To that end, images of statistically sufficient similarity are identified and are assumed to be the same. The similarity of the images themselves and the categorization of those images (e.g., images likely to be rooms) are considered in a determination of whether the source and target listings are for the same cross-listed product.

For each pair of listings, comparison logic 226 extracts (determines) the image keypoints of a first, internal image (of the source listing) and keypoints of a second, external image (of the target listing). A computation is then performed to determine the number of keypoints in common, through a comparison of descriptors (vectors) of the keypoints. In an exemplary embodiment, the Accelerated-KAZE (A-KAZE) algorithm, or any similar algorithm is used to extract the keypoints of first image and the second image. A bi-directional k nearest neighbor (kNN) search algorithm may then be executed to search the matching keypoints between the first and second image. In one embodiment, where the A-KAZE algorithm is used to produce binary vectors, the matching keypoints between the first and second image are searched according to the Hamming distance. In another embodiment, where a Scale-Invariant Feature Transform (SIFT) algorithm is used to produce float vectors, the matching keypoints between the first and second image are searched according to the shortest Euclidean distance. Similarly, other embodiments may use other calculations dependent upon the keypoint algorithm used. Corresponding keypoints between the images, also referred to herein as "match" or "matched" keypoints, are determined and a matched keypoint set is stored in image database 270 or in some embodiments in a temporary memory.

Alternate embodiments may use, in place of a kNN search, which may be resource intensive, an approximate kNN search (such as Fast Library for Approximate Nearest Neighbors (FLANN)) that may use any of proximity graph methods, locality sensing hashing, and the like, or any other appropriate method to find an approximate set of common keypoint vectors. A kNN search may be more reliable and comprehensive while an approximate kNN search may be more resource efficient. These types of algorithms, applied in the exemplary embodiment by comparison logic 226, find a statistically significant number of features of the image, so as to get a reliable set of results regarding the similarity of each combination of images between the paired (source, target) listings.

In some embodiments, keypoints and keypoint metadata are stored in keypoint data 272-2 and 274-1 as tables of keypoints relative to a particular image, and common keypoints may be found by joining the tables of the two images, for instance, an inner join function that preserves only the keypoints in common of the two images. Common keypoints may be determined through any known means.

Figure 4A:
FIG. 4A illustrates an exemplary first image from a source property listing, in accordance with some embodiments of the present disclosure.
Figure 4B:
FIG. 4B illustrates an exemplary second image from a target property listing, in accordance with some embodiments of the present disclosure.
Figure 4C:
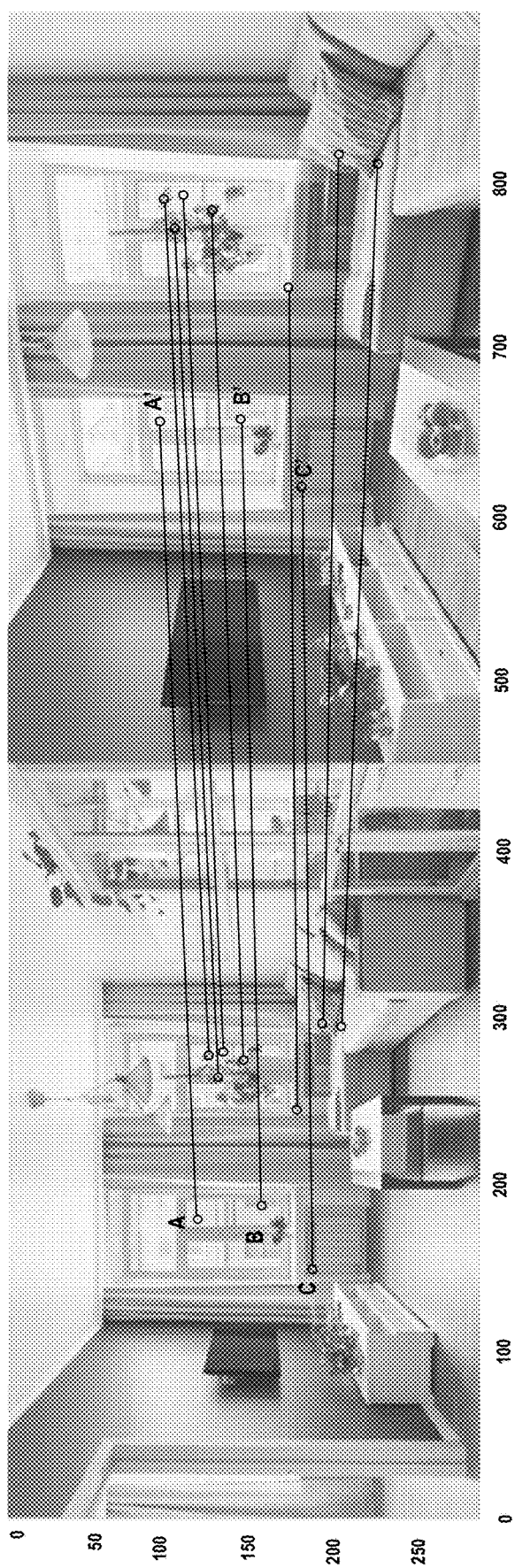
FIG. 4C illustrates an exemplary keypoint comparison between the first image of FIG. 4A and the second image of FIG. 4B, in accordance with some embodiments of the present disclosure.

As an illustrative example, FIG. 4A may be understood as a first, source image stored in merchant images 272 and FIG. 4B may be understood as a second, target image stored in competitor images 274. As can be seen, FIGS. 4A and 4B are taken at different angles, but appear to be images of the same room. With reference to FIG. 4C, through application of the A-KAZE algorithm, a plurality of keypoints including keypoints A, B, and C have been identified in the leftmost image corresponding to FIG. 4A while a plurality of keypoints including keypoints A', B', and C' have been identified in the rightmost image corresponding to FIG. 4B, each keypoint representing a point of interest in the respective image. The keypoints are compared through a kNN search, and are bound to be matching. Keypoint A matches keypoint A', keypoint B matches keypoint B', and keypoint C matches keypoint C', the matched keypoints showing similar clusters of pixels even where the images are taken of the subject matter at a different angle. If the number of matched keypoints is significant, the images in FIGS. 4A and 4B are determined to be of the same subject.

Figure 5A:
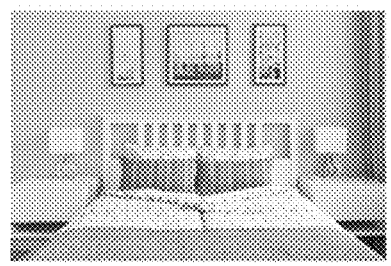
FIGS. 5A-5D illustrate results of image keypoint comparison between an image of a source listing and an image of a target listing, in accordance with some embodiments of the present disclosure.
Figure 5A:
Figure 5B:
Figure 5B:
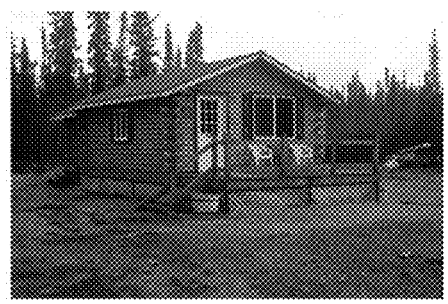
Figure 5C:
Figure 5C:
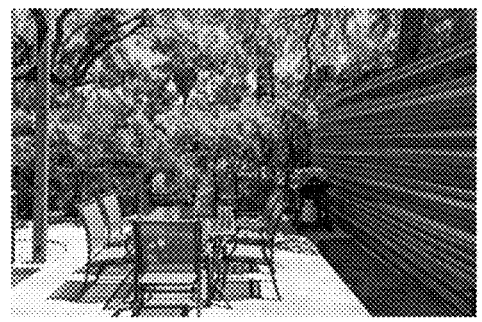
Figure 5D:
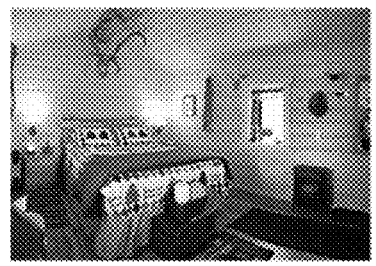
Figure 5D:
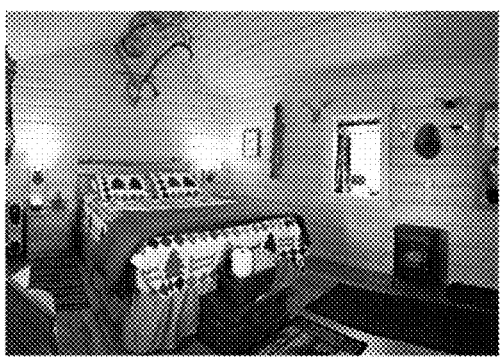

This computation is performed image by image for each possible pairing, or tuple, or images stored across merchant images 272 of a source listing and competitor images 274 of a target listing. As an example, for a first image in merchant images 272 having five (5) keypoint vectors and a second image in competitor images 274 having five (5) keypoint vectors, the first image and the second image may have any of 0-5 keypoints in common. Different image pairs will have different numbers of keypoints in common. FIGS. 5A-5D depict examples of four different pairs of images, the leftmost image of each pair being from a source listing and the rightmost image of each pair being from a target listing. For each image pair, a number of matched keypoints has been identified. It is apparent that while FIGS. 5B and 5D have several keypoints in common, suggesting similarity, FIGS. 5A and 5C are highly dissimilar and have few or no matched keypoints. The number of common keypoints is therefore determined for each image pair, with a greater number of keypoints indicating a greater similarity between the actual images. As a result of this step, for each pair of images, comparison logic 226 obtains a number of matched keypoints.

It can be generally understood that the more keypoints that are matched, the more likely the two images are the same. In some embodiments, a number of matched keypoints may correlate with a percentage of confidence that the images are the same. In an exemplary embodiment, comparison logic 226 sets a threshold of similarity, such as a number or percentage of matched keypoints or percentage of confidence of similarity, that must be met before a determination is made that the images are the same (or sufficiently the same). In an exemplary embodiment, this threshold value is set by a machine learning algorithm, however, in other embodiments, it may be set in advance by the system 120 based on any factor such as expected types of images. In one embodiment, the threshold is "tuned" to be very conservative (having a high threshold for similarity), under the assumption that common images have many redundant features, however, other embodiments may apply different thresholds. For products that may appear highly similar but may have small, meaningful differences (such as condition or cosmetic differences in a range or otherwise identical products), a high threshold may be most appropriate.

After determining a number of keypoints that the images have in common in a listing to listing comparison (Step 316), the process continues to Step 318, in which the comparison logic 226 works to determine whether two images are cross-listed. As part of this analysis, comparison logic 226 determines which of the matched images of the two listings fall into certain image categories that are more indicative of the uniqueness or authenticity of a property listing. For purposes of explanation, in an exemplary embodiment, images determined to be of rooms (and are therefore classified with one of the kitchen, bathroom, bedroom, or living room categories, or any subset thereof) may be more authentic or more representative of a unique property based on a position that an owner would be unlikely to use photographs of a different house, apartment, or property. Conversely, images falling into a pool category, or a view category (which may be, e.g., images of a map, a floorplan, a shared amenity, a local point of interest (e.g., the Eiffel Tower)) may be commonly relevant to multiple properties, and therefore, may be commonly used between differing property listings. Accordingly, in an exemplary embodiment, the fact that two similar images are both classified as rooms may be more indicative of a cross-listing than two images both depicting a commonly-visible or accessible area. These positions and assumptions may differ in different embodiments based on the type of product, the number of merchants, market factors, and other considerations.

In one embodiment, comparison logic 226 may consider, in step 318, in its determination of whether an internal listing and an external listed are cross-listed any or all of the following features:
 (1) the number of keypoints in common between the most similar images
 (2) the number of keypoints in common between the most similar images that are highly likely to be a room, and
 (3) the number of images paired that are rooms.

In one embodiment, item (2) may be calculated by the formula: probability that image is room×number of keypoints.

In an exemplary embodiment, comparison logic 226 may contain logic that applies machine learning techniques to identify, in real time or approaching-real time, predictive values for weights assigned to each of these features. These predictive values may be based on, e.g., historical patterns of common interests, or geographic areas in which more listings are cross-listed, reliability of image categorization in different listing types or regions, or any other collected historical data. The logic may then generate a predictive score indicating a likelihood of cross-listing using a weighted linear analysis. Where the score exceeds a certain minimum threshold, the source and target listings are determined to be for the same unique property, i.e., that the property has been cross-listed across the merchant platform and the competitor platform. Some embodiments may generate the cross-listing score using a non-linear analysis such as a supervised regression or classification task using a gradient boosted decision tree (GBDT) model. In still other embodiments, comparison logic 226 may assign any of weights through a manual determination by the service provider, a deterministic formula, or any other appropriate method. Alternate embodiments may include any combination of the above-mentioned learning or deterministic algorithms, or any other known algorithm.

In some embodiments, comparison logic 226 may apply different weighting to combinations of multiple different features. For instance, individually, similarity of two compared images may be highly relevant, and when taken in combination with another feature, the relevance of such similarity may decrease to the point that the images may be discounted or determined to not be indicative of cross-listing. An one example, where two compared images are determined to be the same (e.g., sharing a high number of keypoints) but have a low likelihood of being a room (e.g., 10%), such combination of features may indicate irrelevance.

In some embodiments, all three of features (1)-(3) above are used in a determination of commonality/cross-listing, however, other embodiments may use more or less than the above-mentioned features. For instance, in an exemplary embodiment (not shown in FIG. 3A), the comparison logic 226 may use, in addition to image comparison data, all available data about a listing stored in either of merchant listing database 240 and competitor listing database 250, for example, to compare listing text data (242, 252), listing location data (244, 254), or any other appropriate comparator.

In an alternate embodiment, prior to any weighting by the comparison logic 226, classification logic 224 may filter or remove one or more images that it has classified into one or more image categories. For instance, classification logic classifies images in image database 270 a variety of categories, and may thereafter remove, delete, or filter out all images classified as, e.g., views, under the assumption that such images are less relevant. Of course, the foregoing is merely exemplary, and any type or number of classifications may be removed/filtered in different embodiments. In these embodiments, only the filtered or culled images, that is, a limited set of all the images in the original property listings, are provided to the comparison logic 226. Accordingly, the number of images processed by comparison logic 226 is reduced, and the comparison itself may be expedited.

Figure 6A:
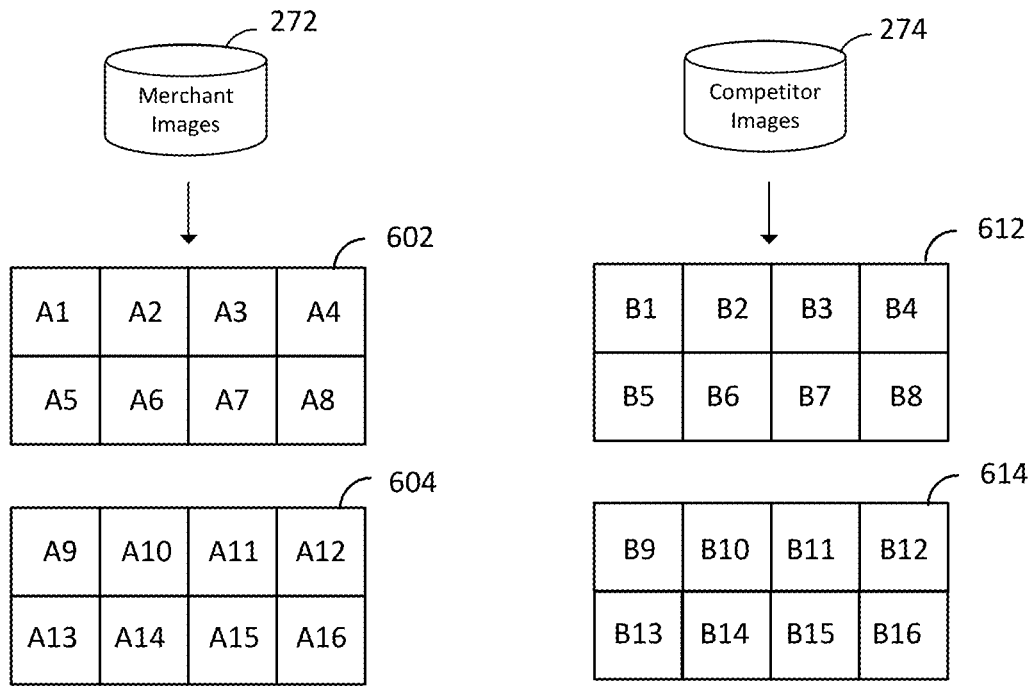
FIGS. 6A and 6B illustrate an aggregate image keypoint comparison between multiple images of a source listing and multiple images of a target listing, in accordance with some embodiments of the present disclosure.
Figure 6B:
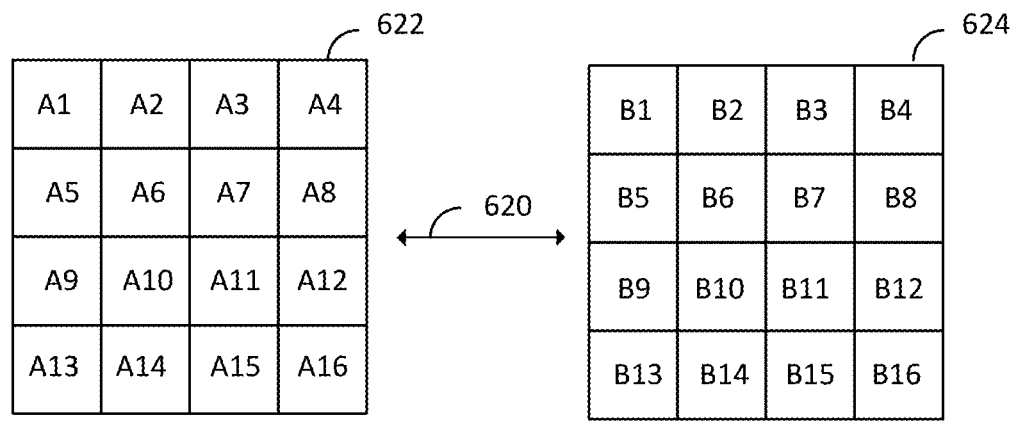

Some alternate embodiments may exist where images are likely to be highly dissimilar, the number of listings to be compared is high, and/or cross-listing of listings is rare or unlikely. In such embodiments, intensive image-by-image scrutiny of all images in source and target listings may be unnecessary thorough for a determination that the listings are dissimilar. FIGS. 6A-6B illustrate an embodiment where comparison logic 226 first determines whether the listings are likely to have images in common between them, and if so, performs a more computationally expensive pairwise image matching. For instance, where a particular source listing has two corresponding images 602 and 604, comparison logic 226 may take images 602 and 604, stored in merchant images 272 (FIG. 6A) and may generate from those images an aggregate source image 622 (FIG. 6B). Similarly, where a particular target listing has two corresponding images 612 and 614, comparison logic 226 may take images 612 and 614, stored in competitor images 374, and may generate an aggregate target image 624. While FIG. 6A depicts two images corresponding to the source listing and two images corresponding to the target listing, other embodiments may have any number of respective images associated with the source and target listings, and the number of images need not correspond between the two listings. In some embodiments, the images used need not comprise all the images stored in association with the respective source and target listings, and rather, any non-zero number of images, or portions of images, may be included in an aggregate image for a listing. For instance, certain categories of images (e.g., view images) may be filtered out prior to any aggregation.

As an example of such an embodiment, with reference to FIG. 6A, source image 602 has keypoints A1-A8, source image 604 has keypoints A9-A16, target image 612 has keypoints B1-B8 and target image 614 has keypoints B9-B16 (as stored in keypoint data 272-2, 274-2). Of course, any number of keypoints and descriptors may exist for different images in other embodiments. Aggregate images 622 and 624 share the keypoint data of their composite images, and, as illustrated in FIG. 6B, images 622 and 624 each have a respective matrix of keypoints. Comparison logic 226 may then run an kNN or approximate kNN search (e.g., with the FLANN algorithm) on these matrices of aggregate images 622, 624 (element 620) to generate a number of keypoints matched across the aggregate images. Where enough matching keypoints exist between the aggregate images (that is, where the number of matched keypoints exceeds a certain threshold), only then would comparison logic 226 perform an image by image analysis of two listings, including a consideration of the image category in a determination of likelihood of cross-listing (Step 318). By these means, an expensive image-by-image comparison is avoided for listings that are likely dissimilar.

The threshold necessary to trigger performance of the image-by-image analysis in these "aggregate" embodiments need not necessarily be as high as a threshold needed indicate that two images are identical or highly similar. Rather, the threshold applied to the aggregate images need only suggest enough points of similarity that additional consideration of category would be valuable. For purposes of explanation, if a threshold of 50 matched keypoints (or any appropriate number) is necessary to determine that two images are identical, a smaller number of matched keypoints between the aggregate images (e.g., 5 or 10 matched keypoints) might be sufficient to trigger comparison logic 226 to perform FLANN at an image-by-image level. Accordingly, wholly dissimilar listings, with no similarity of images, may be discarded from consideration, and the number of individual images processed by comparison logic 226 may be reduced, improving processing efficiency.

Figure 3A:
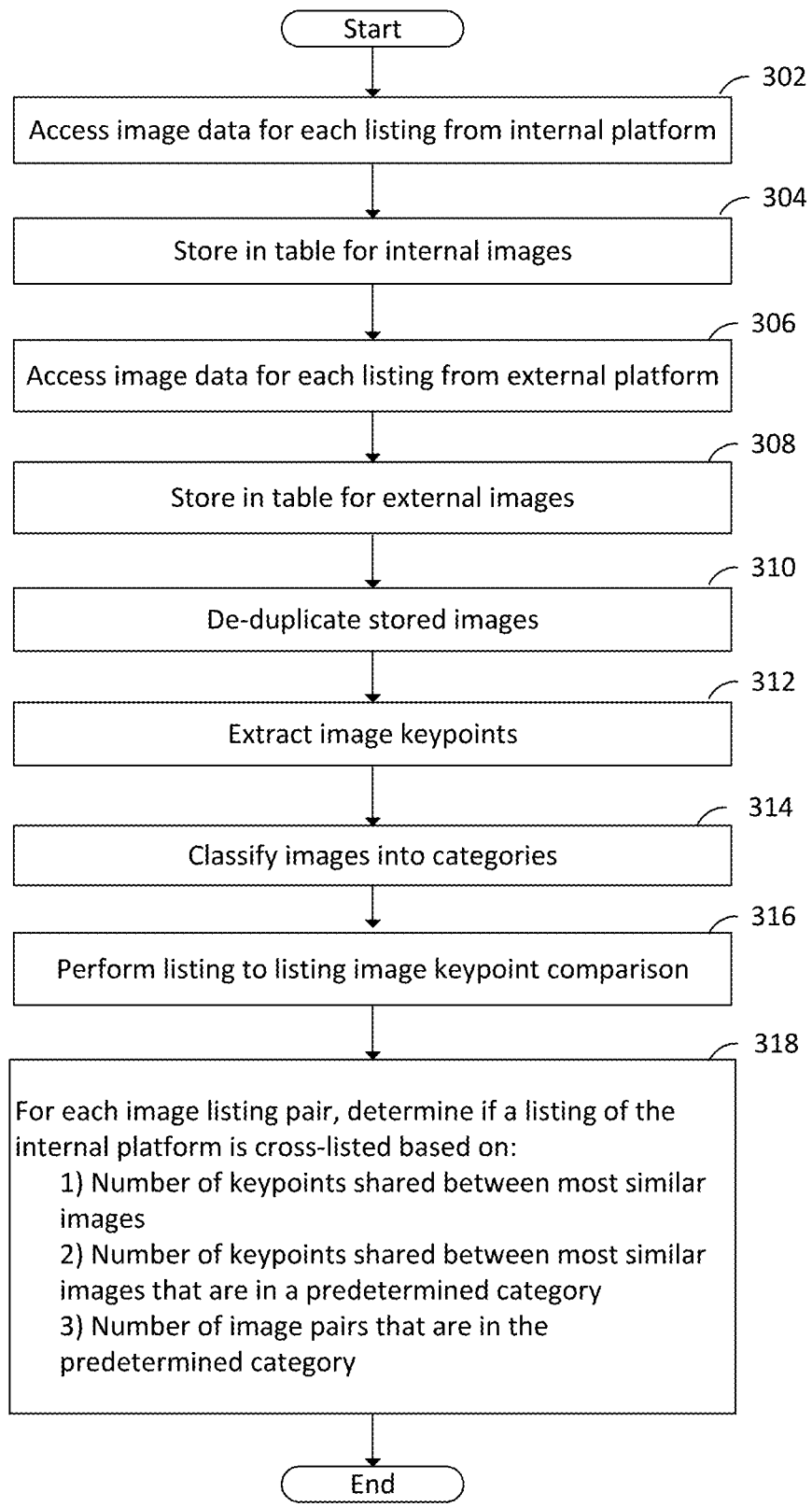
FIG. 3A illustrates a method of generating a list of cross-listed property listings in accordance with some embodiments of the present disclosure.
Figure 3B:
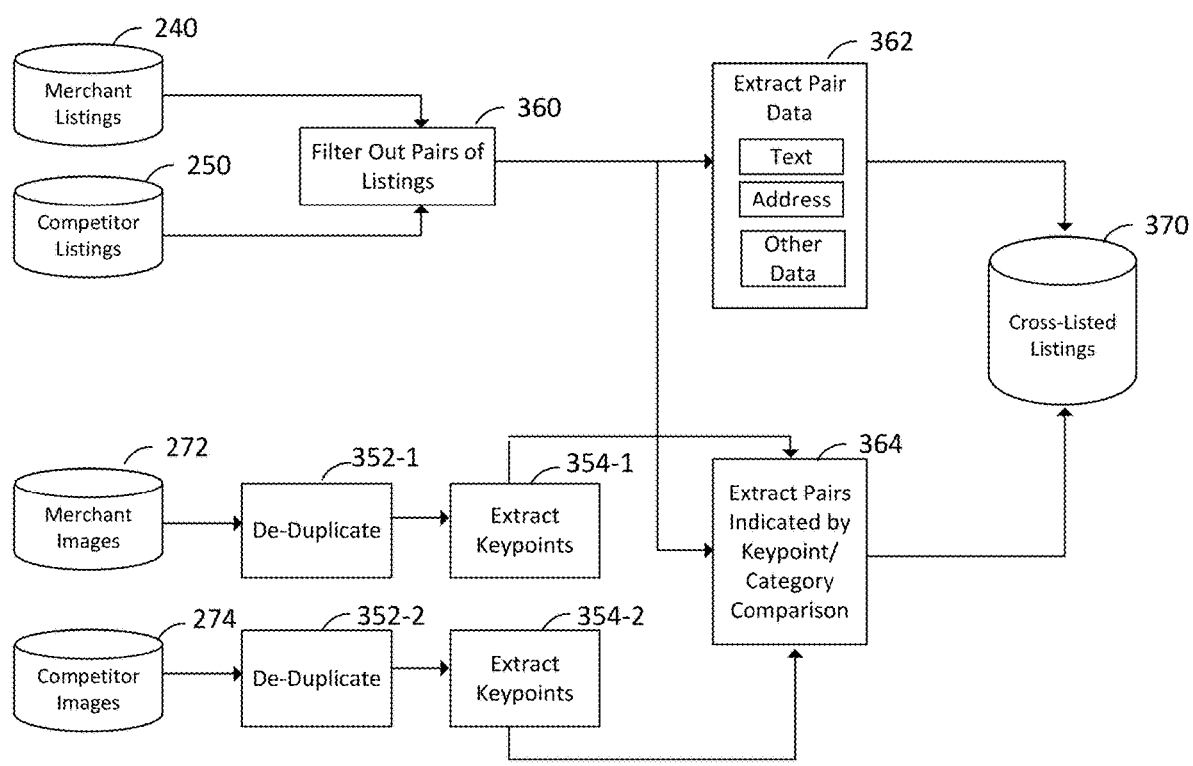
FIG. 3B illustrates a process of generating a list of cross-listed property listings in accordance with some embodiments of the present disclosure.

FIG. 3B depicts another view of an exemplary process along the lines of Steps 310-318 in FIG. 3A. In box 352-1, image data stored in merchant images 272 is de-duplicated (as in Step 310), so as to eliminate redundancy of image processing. In parallel, in box 352-2, image data stored in competitor images 274 is de-duplicated. The output of boxes 352-1 and 352-2, the output being sets of unique image data, is input into boxes 354-1 and 354-2 respectively, in which keypoints for each image in the image data are extracted (as in Step 312). In some embodiments (not shown), the image classification of Step 314 may be performed as part of the processing of boxes 352-1 and 354-1 (and/or 352-2 or 354-2), or afterward. In other embodiments (not shown) the image classification may be performed in advance of any logic performed by comparative logic 226, and such image category data may be stored in association with image data 246 and/or image data 256 prior to the processes illustrated in FIGS. 3A and 3B.

In box 360, every paired combination between a merchant (source) listing from merchant listing database 240 and a competitor (target) listing from competitor listing database 250 is considered, in turn, in boxes 362 and 364 (as in Steps 316 and 318). In box 362, non-image data from the source and target listing are extracted and compared. In box 364, image data from the images of the source and target listing are considered, and a keypoint comparison and image category analysis is performed on an image-by-image basis for all combination of images between the source and target listing. The output of the analyses of boxes 362 and 364 are used in a determination of whether the source and target listings are cross-listing, i.e., reflect the same property or product. A set of cross-listed listings may be determined and stored in repository 370.

In another embodiment (not shown), the output of boxes 362 and/or 364 may be sent to a remote or third-party processing server to determine whether the source and target listings are cross-listed. Put another way, some or all of the processing performed by comparison logic 226 may be outsourced or distributed between one or more computing entities. The outcome of the cross-listing determination may thereafter be transmitted to system 120 or to another system on merchant processing server 115.

Comparison logic 226 need not be limited to keypoint extraction and comparison, and other embodiments may use any appropriate method of image comparison to determine the likelihood of similarity between two images. In one embodiment, image hashing may be used, in place of or in addition to keypoint extraction, to compare the images between a source and target listing. More particular, a hash of each image in the source and target listings may be stored, and the hashed information of a merchant image compared to the hashed information of a competitor image. Such an embodiment may speed up processing time by comparison logic 226, and may be most beneficial where cross-listed listings will have one or more identical images, with minimal or no discrepancies between images (e.g., angle, brightness, etc.), as such discrepancies may alter the value of a hash.

In still another embodiment, non-image listing features (e.g., title, description, occupancy numbers, address, amenities) and/or location data of a property listing may be used, in place of or in addition to keypoint extraction, as a method to compare the listings. For instance, as in box 362 of FIG. 3B, text, location, and/or other data may be extracted from merchant listing database 240 and competitor listing database 250 for each listing of a paired source and target listing. The extracted information may be compared to determine relevant comparative features. For purposes of explanation, one embodiment may look to a difference between titles, number of text characters, address, etc., to the presence or absence of corresponding features (e.g., whether the property has a pool or other amenity), or other relevant comparison of structured or unstructured data associated with the listings. For instance, the Levenshtein distance or TF-IDF cosine similarities between a sequence (e.g., character string of description) in the source listing description and a sequence in the target listing may be calculated to provide an indicator of similarity between the listings.

The systems and methods described with reference to FIGS. 1 through 6B above may in some embodiments be bottlenecked in performance by the amount of source and target data that must be compared. To reduce the complexity of the tasks performed, listing comparison logic 220 may attempt to reduce the starting set of listings to be considered. That is, rather than compare each listing of merchant listing database 240 to each listing of competitor listing database 250, the comparative targets within competitor listing database may be filtered with respect to a relevant factor. In embodiments relating to physical property listings, i.e., listings with an associated geographic location, an exemplary embodiment may be begin by assuming that cross-listed images are relatively geographically close to each other. Accordingly, for each source listing, the target listings compared thereto are limited to a particular geographic range.

Figure 7A:
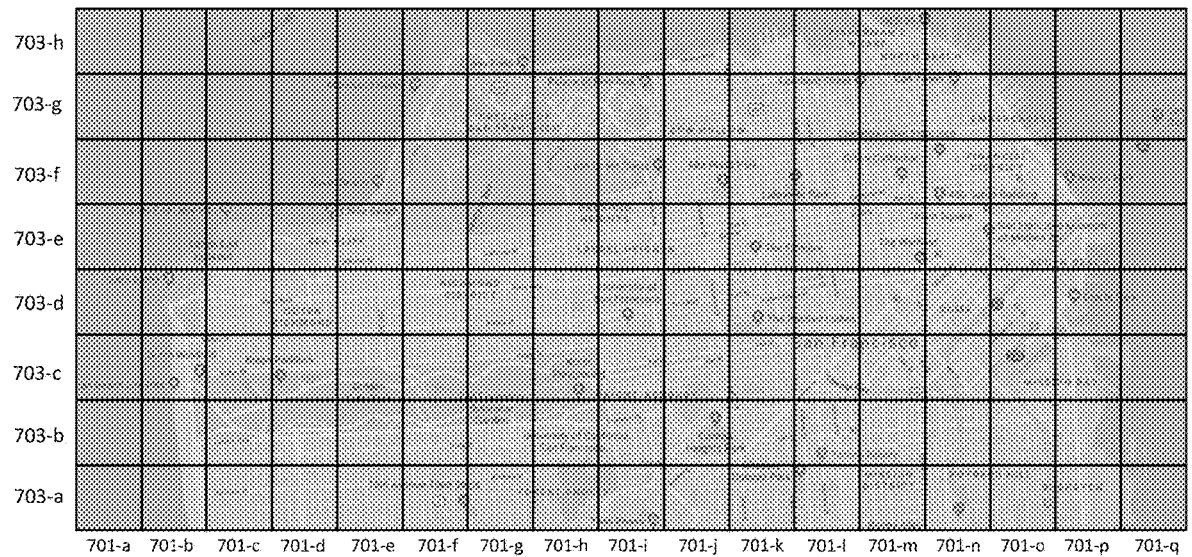
FIG. 7A-7D illustrate maps from which candidate target listings for pairing with a source listing can be determined, in accordance with some embodiments of the present disclosure.
Figure 7B:
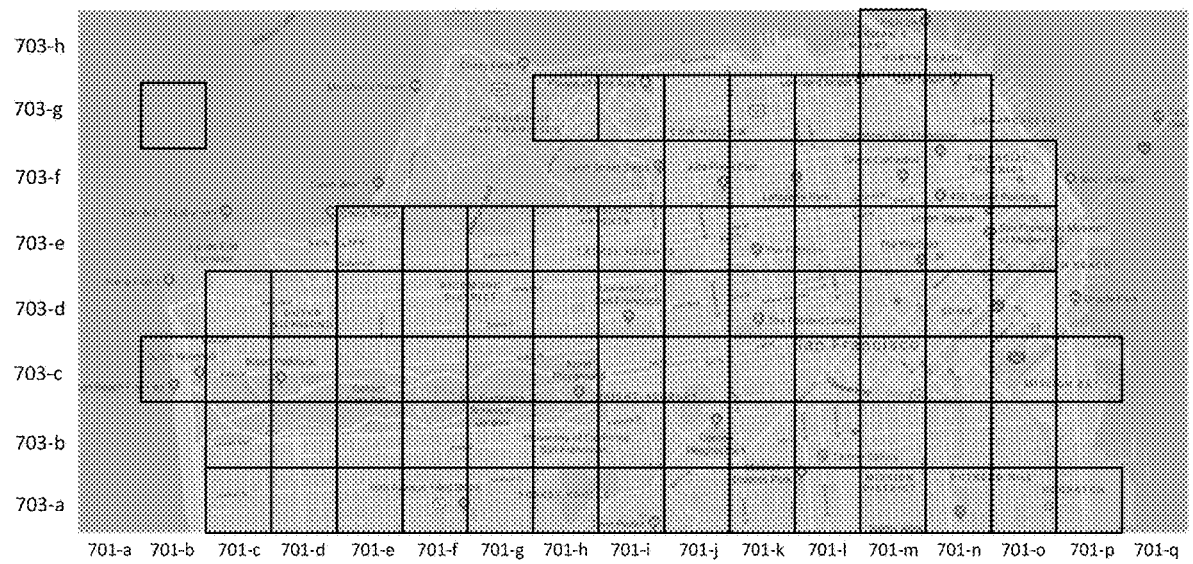

One exemplary embodiment defines, for a geographic area, a set of virtual boundaries (or geo-fences) delineating different geographic areas. FIG. 7A illustrates a 2-dimensional grid of virtual tiles (or cells) each representing a distinct geographic area, the tiles being positioned horizontally at positions labelled 701-a through q, and vertically at positions labelled 703-a through h. For instance, the bottom-most, left-most tile may be understood as (701-a, 703-a), while the top-most, right-most title may be understood as (701-q, 703-h). In the illustrated embodiment, the tiles are squares, i.e., the mapped space is gridded into square-shaped tiles, however, in other embodiments, other appropriate tile shapes may be used, such as circles, rectangles, hexagons, triangles, non-polygonal, etc. In some embodiments, the shapes may be any appropriate tessellating shapes, so that all areas on the map are covered by one or more virtual spaces. In other embodiments, the tiles may have differing shapes, may overlap or leave surface areas uncovered. For instance, FIG. 7A depicts a fully-covered map, and some embodiments may cover the entire global surface in such tiles. Other embodiments, including the embodiment of FIG. 7B may only tile a limited set of areas, for instance, those in geographic areas relevant to the known areas of listings in merchant listing database 240. In the embodiment of FIG. 7A, the size of each virtual corresponds to a specific size (in some embodiments, 1.3 km×1.3 km), though other embodiments may differ in size or may have tiles of varying sizes.

In some embodiments, the size of a tile may differ, e.g., by city, based on the density of listings in merchant listing database 240 relevant to that geographic area, on population, or any other appropriate factor. In still other embodiments, the size, shape, and/or position of the virtual tiles may be mapped based on longitude/latitude. In an exemplary embodiment, the size, shape, and/or position of the tiles may be generated based on a deterministic algorithm, however other embodiments may use a learning algorithm, manual classification, etc. While the exemplary embodiment of FIG. 7A illustrated a pre-determined grid (that is, stored in advance in memory 210), other embodiments may perform a dynamic delineation of virtual spaces at the time of processing by listing comparison logic 220.

Figure 7C:
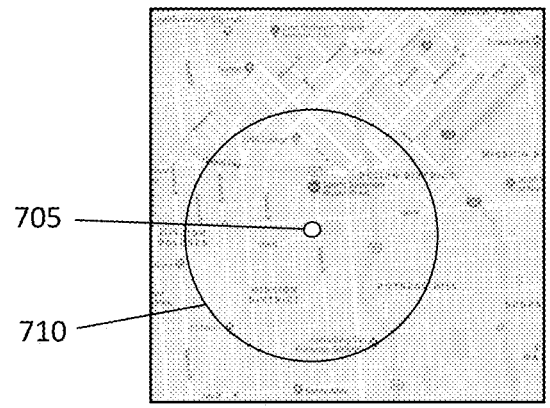

Listing comparison logic 220 may, in the exemplary embodiment, include logic to pair a source listing (in merchant listing database 240) with each candidate target (competitor) listing within a particular distance from the location of the source listing. Therefore, in highly dense areas where multiple target listings are close to a source listings (e.g., a populous city), a higher number of pairings will be considered for a source listing, and in a less dense area, a lower number of source-target pairings will be generated. With reference to FIG. 7C, the distance of candidate target listings from the source location 705 (a known geographic location of a source listing) may, in some embodiments, fall within an area 710 defined by a particular radius. The value of such radius may be predetermined or may be dependent upon the relevant geographic area. Listing comparison logic 220 may enumerate all source-target pairs, and then filter out listings outside the threshold radius (e.g., 500 m, or any appropriate value).

Figure 7D:
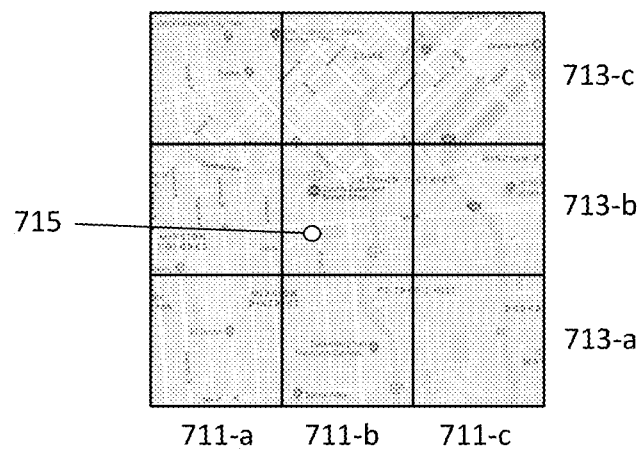

In an alternate embodiment of FIG. 7D, the target listings are considered on a per-tile basis. For a source listing located as a position 715 in tile (711-*b*, 713-*b*), candidate target listings in competitor listing database 250 are pulled first from the same tile (711-*b*, 713-*b*) and then from the surrounding tiles (711-*a*, 713-*a*), (711-*b*, 713-*a*), (711-*c*, 713-*a*), (711-*a*, 713-*b*), (711-*c*, 713-*b*), (711-*a*, 713-*c*), (711-*b*, 713-*c*) (711-*c*, 713-*c*). Listing comparison logic 220 may enumerate all source-target pairs, and then filter out listings outside the neighboring tiles. In another embodiment, only neighboring tiles in cardinal directions (e.g., (711-*b*, 713-*a*), (711-*a*, 713-*b*), (711-*c*, 713-*b*), and (711-*b*, 713-*c*)) are considered, and not diagonal tiles.

In the embodiments of FIGS. 7A through 7D, the comparison of the source and target listings may be performed in the manner described above with regard to FIGS. 1 through 6B. The images of the filtered source-target pairs, and their respective keypoint data, may be stored in image database 270 in the manner described above.

By these means, product or property listings that are cross-listed across multiple platforms may be identified with high reliability, even where the text-based portions of the cross-listings are different or inaccurate. For instance, for physical property listings, the specific (or even general) addresses need not be known. Additionally, a determination of cross-listing may be made even where the descriptions of the properties differ, because the image comparison performed by the systems and methods described herein recognize images of listings with matching subjects, regardless of differences in rotation, angle, brightness, resolution, size, or other image qualities. This identification is based not only on image comparison between listings, but on the particular relevance of the matched images indicated by their categorization. Further, this identification is performed dynamically, that is, it is performed by an automated analysis that considers the variance of listings over different platforms, such as changes or edits to listing data, the addition or removal of images, and the creation of new listings, among other things. Further, the solutions provided by the methods and systems described herein are scalable, requiring no manual curation. Due to this scalability, the systems and methods described herein may process and make determinations on a greater number and complexity of listings than could be handled by a human actor. What is more, because the analysis of images may be done by a learning solution (e.g., a machine learning algorithm), patterns may be recognized that highlight differences in listing descriptions, images, etc., such as distinctions between listings for different geographic areas, that may affect the factors most relevant to a cross-listing analysis.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for identifying correlation between property listings, the method comprising:
   identifying, within a geographic area of a predetermined size, a source property listing and a target property listing;
   storing, in a first database, at least one image corresponding to the source property listing;
   storing, in a second database, at least one image corresponding to the target property listing;
   for each image corresponding to the source property listing and each image corresponding to the target property listing, identifying a group of keypoints in the image, each keypoint corresponding to a keypoint descriptor;
   for each image corresponding to the source property listing, determining an image category for the image;
   for each image corresponding to the source property listing,
   (i) comparing the keypoint descriptors of the group of keypoints in the image to the respective keypoint descriptors of the group of keypoints in each of the at least one images corresponding to the target property listing;
   (ii) determining, based on the comparing, a number of shared keypoints between the image corresponding to the source property listing and each respective image corresponding to the target property listing;
   (iii) determining, for each image corresponding to the target property listing, based on the determination of the number of shared keypoints, whether to pair the image corresponding to the source property listing with the image corresponding to the target property listing;
   determining a likelihood of correlation between the source property listing and the target property listing based on one or more of: (1) a number of shared keypoints between a first image corresponding to the source property listing and a second image corresponding to the target property listing, (2) whether the first image is paired with one or more images corresponding to the target property listing, and (3) the image category for the first image; and
   removing, from the first database, at least one image corresponding to the source property listing having an image category of view.

2. The method of claim 1, wherein the image category for the first image is one of: kitchen, bathroom, living room, bedroom, pool, and view.

3. The method of claim 2, wherein the likelihood of correlation between the source property listing and the target property listing is higher where (i) the first image is paired with one or more images corresponding to the target property listing and (ii) the image category for the first image is one of: kitchen, bathroom, or living room.

4. The method of claim 1, further comprising:
   identifying source description data corresponding to the source property listing; and
   identifying target description data corresponding to the target property listing,
   wherein the determining of the likelihood of correlation between the source property listing and the target property listing is further based on a comparison of the source description data and the target description data.

5. The method of claim 1, wherein the identifying of the source property listing and the target property listing comprises:
   identifying a first geographic area;
   dividing the first geographic area into one or more virtual areas of the predetermined size;
   selecting, from among the one or more virtual areas, a second geographic area, the second geographic area being smaller than the first geographic area;
   identifying, within the second geographic area, (i) the source property listing and (ii) a location of the source property listing;
   identifying a set of one or more target property listings within a first distance from the source property listing; and
   selecting a target property listing from the set of one or more property listings.

6. The method of claim 1, wherein the geographic area is one of: a squared area with a predetermined size of 1.3 km in length, or a circular area with a predetermined size of 1.3 km in diameter.

7. A method comprising:
   storing, in a first database, at least one image corresponding to a source property listing;
   storing, in a second database, at least one image corresponding to a target property listing;
   for each image corresponding to the source property listing, determining an image category for the image;
   for each image corresponding to the source property listing, (i) comparing the image to each of the at least one image corresponding to the target property listing and (ii) determining a level of similarity between the image corresponding to the source property listing and each image corresponding to the target property listing;

determining a likelihood of correlation between the source property listing and the target property listing based on: (1) whether the level of similarity between a first image corresponding to the source property listing and a second image corresponding to the target property listing meets a predetermined threshold of similarity and (2) the image category for the first image; and removing, from the first database, at least one image corresponding to the source property listing having an image category of view.

8. The method of claim 7, further comprising:

for each image corresponding to the source property listing, determining, in a case that the level of similarity between the image and an image corresponding to the target property listing exceeds a predetermined threshold, that the image corresponding to the source property listing and the image corresponding to the target property listing match, wherein the determining of the likelihood of correlation between the source property listing and the target property listing is further based on the number of the one or more images corresponding to the source property listing that match with at least one of the one or more images corresponding to the target property listing.

9. The method of claim 7, wherein the level of similarity between a first image corresponding to the source property listing and a second image corresponding to the target property listing is determined by comparing a plurality of keypoints of the first image with a plurality of keypoints of the second image.

10. The method of claim 7, wherein the level of similarity between a first image corresponding to the source property listing and a second image corresponding to the target property listing is determined by performing an image hash comparison.

11. The method of claim 7, further comprising:

identifying source description data corresponding to the source property listing; and identifying target description data corresponding to the target property listing, wherein the determining of the likelihood of correlation between the source property listing and the target property listing is further based on a comparison of the source description data and the target description data.

12. A system comprising:

a memory configured to store at least one image corresponding to a source property listing and at least one image corresponding to a target property listing; and at least one processor configured to:

for each image corresponding to the source property listing and each image corresponding to the target property listing, identify a group of keypoints in the image;

for each image corresponding to the source property listing, determine an image category for the image;

for each image corresponding to the source property listing, (i) compare the image to each of the at least one image corresponding to the target property listing and (ii) determine a level of similarity between the image corresponding to the source property listing and each image corresponding to the target property listing;

determine a likelihood of correlation between the source property listing and the target property listing based on: (1) whether the level of similarity between a first image corresponding to the source property listing and a second image corresponding to the target property listing meets a predetermined threshold of similarity and (2) the image category for the first image; and remove, from the memory, at least one image corresponding to the source property listing having an image category of view.

13. The system of claim 12, wherein the image category for the first image is one of: kitchen, bathroom, living room, bedroom, pool, and view.

14. The system of claim 13, wherein the likelihood of correlation between the source property listing and the target property listing is higher where (i) the first image is paired with one or more images corresponding to the target property listing and (ii) the image category for the first image is one of: kitchen, bathroom, or living room.

15. The system of claim 12, wherein the level of similarity between a first image corresponding to the source property listing and a second image corresponding to the target property listing is determined by comparing a plurality of keypoints of the first image with a plurality of keypoints of the second image.

16. The system of claim 12, wherein the memory is further configured to store (a) source description data corresponding to the source property listing and (b) target description data corresponding to the target property listing, and wherein the determining of the likelihood of correlation between the source property listing and the target property listing is further based on a comparison of the source description data and the target description data.

17. The system of claim 12, wherein the identifying of the source property listing and the target property listing comprises:

identifying a first geographic area;

dividing the first geographic area into one or more virtual areas;

selecting, from among the one or more virtual areas, a second geographic area, the second geographic area being smaller than the first geographic area;

identifying, within the second geographic area, (i) the source property listing and (ii) a location of the source property listing;

identifying, a set of one or more target property listings within a first distance from the source property listing; and selecting a target property listing from the set of one or more property listings.

18. The system of claim 12, wherein the geographic area is one of: a squared area with a predetermined size of 1.3 km in length, or a circular area with a predetermined size of 1.3 km in diameter.

* * * * *